(12) United States Patent
Gandhi et al.

(10) Patent No.: US 9,580,167 B2
(45) Date of Patent: Feb. 28, 2017

(54) STACKABLE WING FOR AN AEROCAR

(71) Applicant: Toyota Motor Engineering & Manufacturing North America, Inc., Erlanger, KY (US)

(72) Inventors: Umesh N. Gandhi, Farmington Hills, MI (US); Robert W. Roe, Upper Saddle River, NJ (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/872,415

(22) Filed: Oct. 1, 2015

(65) Prior Publication Data
US 2016/0068253 A1  Mar. 10, 2016

Related U.S. Application Data

(63) Continuation of application No. 14/194,795, filed on Mar. 2, 2014, now Pat. No. 9,216,814.

(51) Int. Cl.
| *B64C 37/00* | (2006.01) |
| *B64C 3/56* | (2006.01) |
| *B60F 5/02* | (2006.01) |
| *B64C 3/48* | (2006.01) |
| *B64C 39/08* | (2006.01) |
| *B64C 3/14* | (2006.01) |

(52) U.S. Cl.
CPC ............. *B64C 3/56* (2013.01); *B60F 5/02* (2013.01); *B64C 3/14* (2013.01); *B64C 3/48* (2013.01); *B64C 37/00* (2013.01); *B64C 39/08* (2013.01)

(58) Field of Classification Search
CPC ....... B64C 3/48; B64C 2003/445; B64C 3/44; B64C 3/56; B64C 39/08
See application file for complete search history.

(56) References Cited

U.S. PATENT DOCUMENTS

| 996,456 | A | * | 6/1911 | Christiansen ........... B64C 39/08 244/45 R |
| 1,412,455 | A | | 4/1922 | Crowell et al. |
| 4,537,373 | A | | 8/1985 | Butts |
| 6,199,796 | B1 | | 3/2001 | Reinhard et al. |
| 6,786,450 | B1 | | 9/2004 | Einstein |
| 7,766,281 | B2 | | 8/2010 | Lorkowski et al. |
| 7,874,512 | B2 | | 1/2011 | Xu |
| 8,186,631 | B2 | | 5/2012 | Iannucci |
| 8,262,032 | B2 | | 9/2012 | Sanderson et al. |
| 2012/0134838 | A1 | | 5/2012 | Ramirez Jimenez et al. |

* cited by examiner

*Primary Examiner* — Brian M O'Hara
(74) *Attorney, Agent, or Firm* — Christopher G. Darrow; Darrow Mustafa PC

(57) ABSTRACT

An aerocar includes a body and a multiple of wings. The multiple of wings can be selectively extendable away from a top portion of the body for a flight mode. The multiple of wings can be selectively retractable toward the top portion of the body for a roadable mode.

19 Claims, 3 Drawing Sheets

STACKABLE WING FOR AN AEROCAR

CROSS-REFERENCE TO RELATED APPLICATIONS

This is a continuation of U.S. patent application Ser. No. 14/194,795, filed Mar. 2, 2014, which is hereby incorporated by reference in its entirety.

BACKGROUND

The present disclosure pertains to a vehicle that can be flown as a fixed wing aircraft and driven as a land vehicle. More specifically, the present disclosure is directed to stackable wing architectures therefor.

Flying has always been a dream central to the history of humanity. Aerocars or roadable aircraft are defined as vehicles that may be driven on roads as well as take off, fly, and land as aircraft. Vehicles that demonstrate such capability provide operators with freedom, comfort, and the ability to arrive quickly to a destination as mobility becomes three-dimensional yet remains private and personal. Such vehicles, however, may require various trade offs to facilitate operations in the flight mode and the roadable mode.

Typically, a body of a land vehicle is relatively short to facilitate parking and road maneuverability, whereas a body of an aircraft is relatively long to facilitate flight stability and control authority. In one conventional roadable aircraft, each wing folds upward at a root and downward a mid-span location to stow against the fuselage in the land mode. Although effective, the more numerous the fold locations, the greater the weight and complexity that necessarily influences operability in each mode. Further, such wing stowage may limit operator aft and side views conducive to effective operations in the road mode.

SUMMARY

In one respect, the subject matter described herein is directed to an aerocar. The aerocar can include a body and a multiple of wings. The multiple of wings can be selectively extendable away from a top portion of the body for a flight mode. The multiple of wings can be selectively retractable toward the top portion of the body for a roadable mode.

In another respect, the subject matter described herein is directed to an aerocar. The aerocar can include a body and a multiple of stackable wings. The multiple of stackable wings can be configured such that one or more of the stackable wings is selectively extended away from a top portion of the body for a flight mode. The multiple of stackable wings can be configured such that one or more of the stackable wings is selectively retracted toward the top portion of the body for the roadable mode. The wings can be selectively morphable between a stowed shape for the roadable mode and a deployed shape for the flight mode.

In still another respect, the subject matter described herein is directed to a method of configuring an aerocar. The aerocar has a flight mode and a roadable mode. The aerocar can include a body and a multiple of wings. The method can include selectively extending at least one of the multiple of wings away from a top portion of the body for the flight mode. The method can include selectively retracting the at least one of the multiple of wings toward the top portion of the body for the roadable mode.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
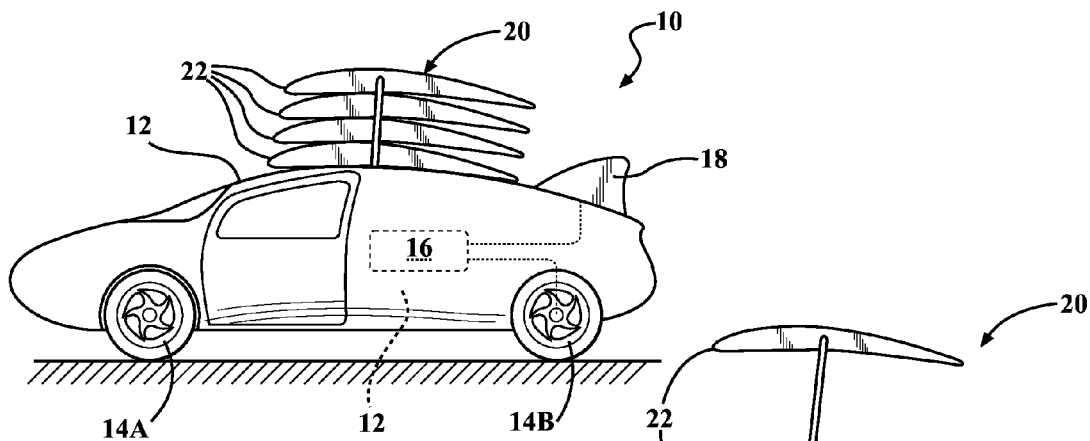
FIG. 1 is a schematic view of an example aerocar with a stackable wing in a roadable mode retracted toward the body according to one disclosed non-limiting embodiment.

FIG. 1 schematically illustrates an aerocar 10 in a roadable mode. The aerocar 10 generally includes a body 12 with a multiple of wheels 14, of which at least one is a steerable wheel 14A and at least one is a drive wheel 14B, a power system 16, a propulsor system 18 and a stackable wing system 20. It should be appreciated that although particular systems and subsystems are separately defined, each or any of the subsystems may be combined or segregated.

The body 12 provides seating for the operator, passengers and cargo. The power system 16 operates to selectively power the drive wheel 14B in the roadable mode as well as the propulsor system 18 such as a pusher propeller, open rotor, turbofan, or other thrust generation system in a flight mode. It should be appreciated that the roadable mode can include various front wheel, rear wheel and all wheel drive configurations. The power system 16 may be of various forms to include, but not be limited to, internal combustion engines, gas turbines, distributed electric propulsion systems or other energy conversion devices and combinations thereof.

Figure 2:
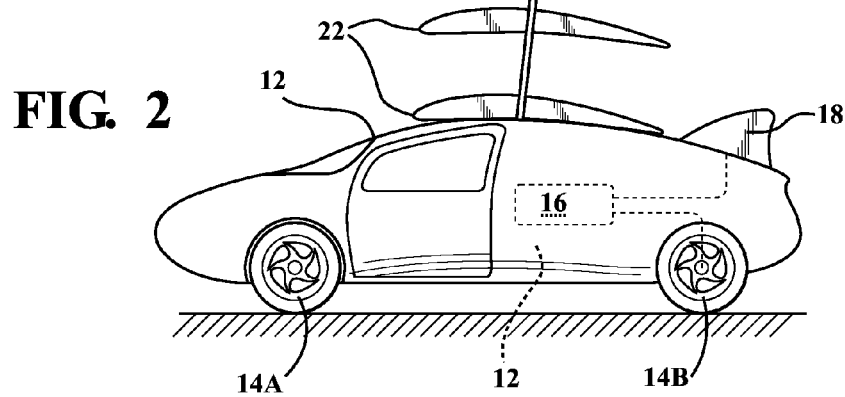
FIG. 2 is a schematic view of the aerocar of FIG. 1 in a first flight mode with all of the stackable wings extended relative to the body.

The stackable wing system 20 selectively extends and retracts with respect to the body 12 and is that which provides a variable amount of lift for specific flight operations such as takeoff, landing (FIG. 2), and cruise (FIG. 3) operations. It should be appreciated that various other systems and subsystems such as a deployable empennage with horizontal and/or vertical stabilizers and various flight control surfaces such as a canards, elevators, rudders, ailerons, flaps, slats, flaperons, etc., are contemplated but not shown for the sake of clarity and to focus upon the stackable wing system 20.

The stackable wing system 20 is located generally atop or at least partially within the body 12 to maintain the aerocar 10 within contained width dimensions to facilitate road operations. That is, each wing 22 of the stackable wing system 20 defines a span generally equivalent to a width of the body 12 to minimize the width of the aerocar 10 when in the roadable mode. The stackable wing system 20 facilitates, for example, parking of the aerocar 10 within typical home garages, parking spots, etc.

Figure 3:
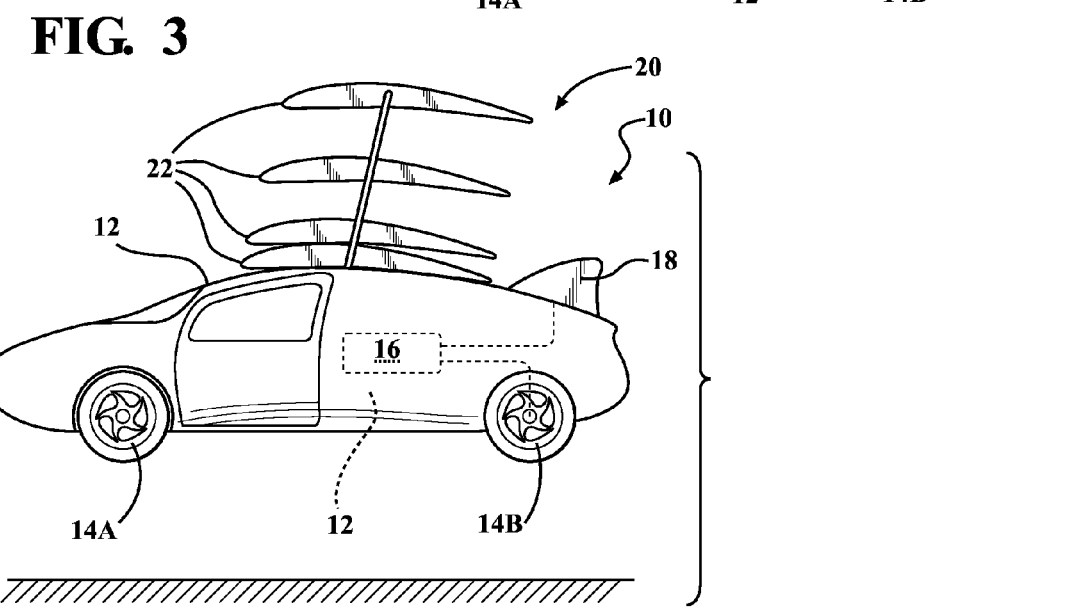
FIG. 3 is a schematic view of the aerocar of FIG. 1 in a second flight mode with less than all of the stackable wings extended relative to the body.

Each of the multiple of wings 22 selectively extend individually from the body 12 such that the stackable wing system 20 may be tailored for various flight operations. For example, all of the multiple of wings 22 are closely stacked atop or at least partially within the body 12 for the roadable mode; all of the multiple of wings 22 are extended from the body 12 for takeoff and landing operations to provide maximum effective wing area (FIG. 2); and less than all of the multiple of wings 22 are extended from the body 12 to adjust the effective wing area for efficient cruise operations (FIG. 3). It should be appreciated that the illustrated operational modes are schematic and merely examples in that various other arrangements and intermediate positions will also benefit herefrom. Furthermore, the inter-wing displacement between each of the multiple of wings 22 may alternatively or additionally be individually configured and controlled to optimize flight operations, stability and maneuverability.

Figure 4:
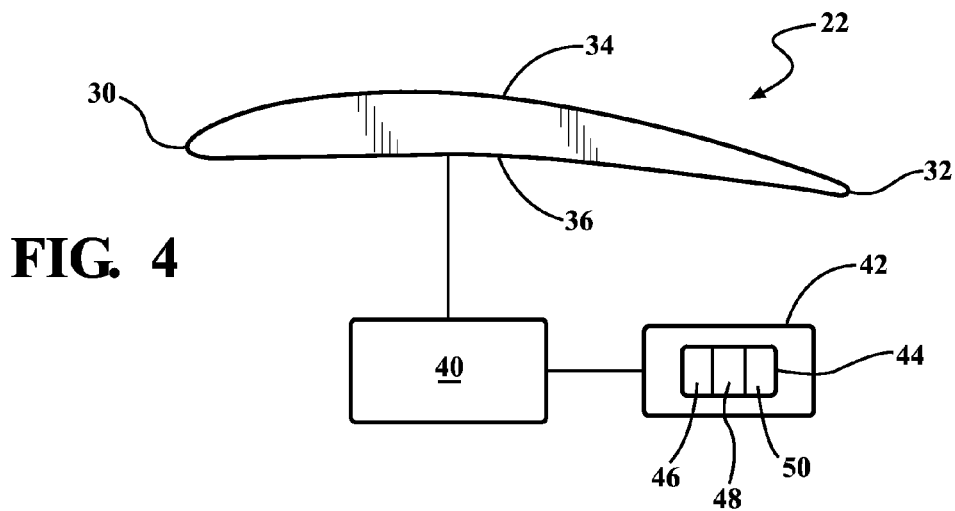
FIG. 4 is a schematic view of one stackable wing in the second flight mode of FIG. 3.

With reference to FIG. 4, each of the multiple of wings 22 has a leading edge 30 and a trailing edge 32, the space between which defines the chord. An upper surface 34 and a lower surface 36 that extend between the leading edge 30 and the trailing edge 32 define the desired airfoil shape. The upper surface 34 may also be generally referred to as the suction side and the lower surface 36 as the pressure side. It should be appreciated that various types of airfoils, e.g., flat bottom, symmetric, non-symmetric, under chamber, and other airfoils may be provided.

In one disclosed non-limiting embodiment, the upper surface 34 forms a rigid shell of a generally fixed shape that may be manufactured of, for example, a prepreg composite material such as woven fiberglass material embedded in a suitable resin matrix, a metal alloy such as aluminum, and combinations thereof. That is, the upper surface 34 is manufactured as a generally rigid and fixed cross-sectional profile.

The lower surface 36, in contrast to the upper surface 34, is morphable. That is, the lower surface 36 has a variable cross-sectional profile that can morph between a stowed shape 36A (FIG. 5) and a deployed shape 36B (FIG. 6). It should be appreciated that the stowed shape 36A and the deployed shape 36B may be of various cross-sectional profiles and the cross-sectional profiles depicted are merely schematic.

Figure 6:
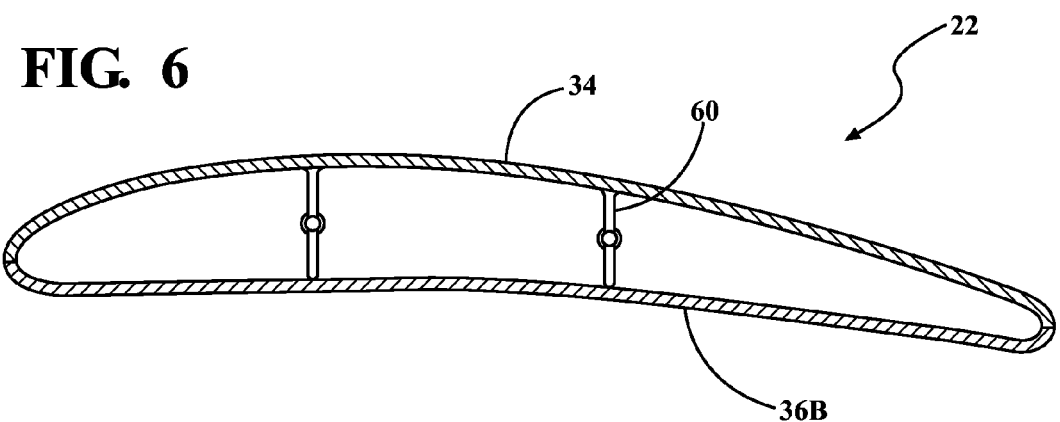
FIG. 6 is a schematic sectional view of the wing of FIG. 4 morphed to a deployed shape.
Figures 7, 8, 9:
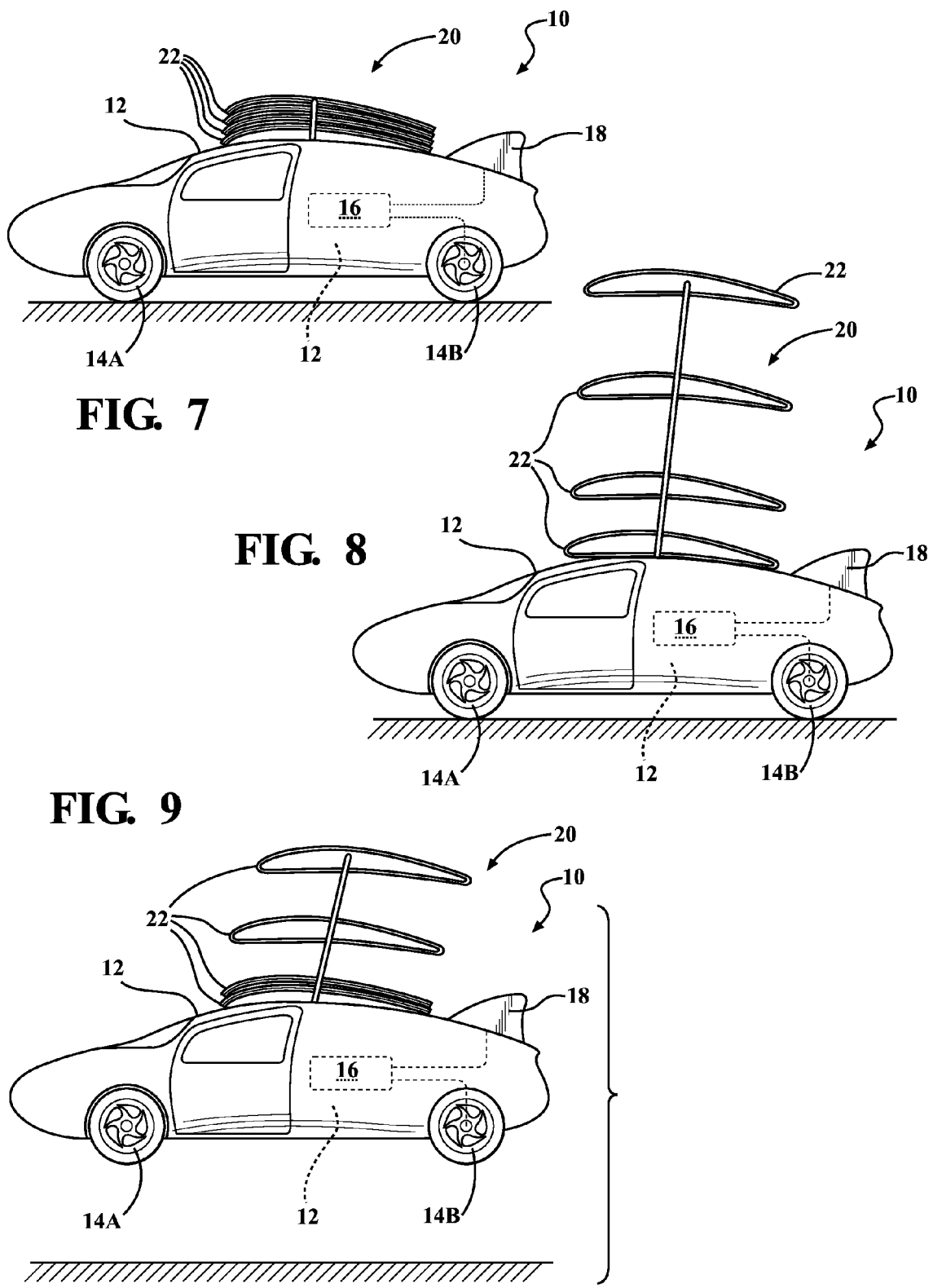
FIG. 7 is a schematic view of an example aerocar with a stackable wing in a roadable mode retracted toward the body according to another disclosed non-limiting embodiment in which each wing is morphable between a stowed and a deployed shape.
FIG. 8 is a schematic view of the aerocar of FIG. 7 in a first flight mode with all of the stackable wings extended relative to the body.
FIG. 9 is a schematic view of the aerocar of FIG. 7 in a second flight mode with less than all the stackable wing extended relative to the body.

In this disclosed, non-limiting embodiment, the stowed shape 36A generally follows the shape of the upper surface 34 such that the multiple of wings 22 may nest when stowed for the roadable mode (FIG. 7). This nestable, stackable wing 22 in this disclosed non-limiting embodiment can thereby morph from the stowed shape 36A (FIG. 5) to the deployed shape 36B (FIG. 6) as each associated wing 22 is selectively extended away from the body 12 to the desired deployed flight mode (FIGS. 8 and 9). That is, the morphable lower surface 36 facilitates a compact, closely stowable architecture with respect to the vehicle body 12 but morphs to the deployed shape 36B (FIG. 6) for the flight mode. Such a closely stowable architecture facilitates, for example, a low profile and stylish body design potential when in the roadable mode that also does not interfere with the side and aft view for the driver.

In this disclosed, non-limiting embodiment, the deployed shape 36B of the lower surface 36 extends generally away from the upper surface 34 to form the airfoil shape. In other words, the stowed shape 36A forms a compact shape of reduced thickness while the deployed shape 36B forms the airfoil shape. That is, the lower surface 36 curves toward the upper surface 34 in the stowed shape 36A and the lower surface 36 curves away from the upper surface 34 in the deployed shape 36B.

The lower surface 36 may be manufactured of a bistable morphing material such as a bistable composite operable to snap from one stable shape into another, e.g., between the stowed shape 36A (FIG. 5) and the deployed shape 36B (FIG. 6). Bistable composites are a type of composite structure that have two statically stable modes. This bi-stability property results from locked, in-plane residual stresses and may be particularly appropriate to an adaptive structure such as the lower surface 36 as continued power is not required to hold each stable mode. The change between stable states is physically realized as a jump phenomenon or snap-through, which is strongly non-linear in nature.

Bistable composites may include non-symmetric laminates, where there are multiple fiber directions within the lay-up such that a bistable curve is formed. Further, various thicknesses may also be provided in the lay-up of the lower surface 36 to control the shape of the curve and thus produce a desired airfoil profile. It should be appreciated that although a bistable morphing material is disclosed in the illustrated embodiment, tri-stable as well as other adaptive structures will benefit herefrom.

Figure 5:
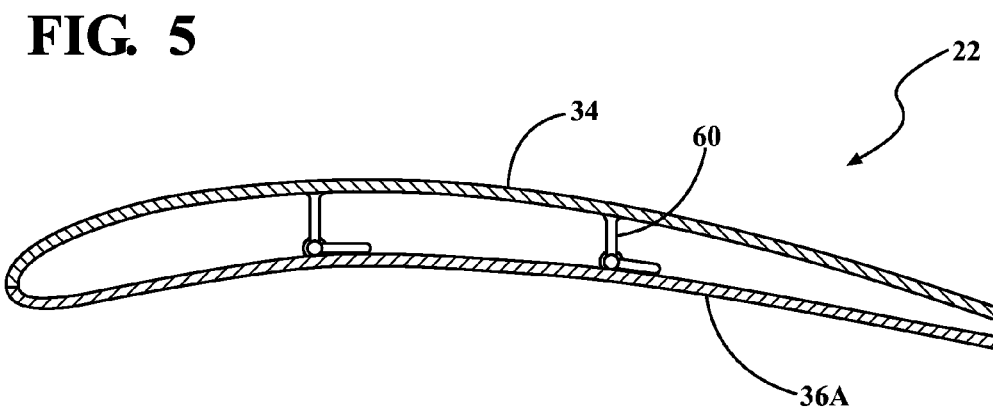
FIG. 5 is a schematic sectional view of the wing of FIG. 4 morphed to a stowed shape.

With continued references to FIG. 4-6, the lower surface 36 may be selectively morphed between the stowed shape 36A and the deployed shape 36B by an actuator 40. The actuator 40 may, for example, include an electrical power source that applies an electric current to generate Joule heating within an electric heating material embedded within the morphing bi-stable laminate. The embedded electric heating material is operable to selectively elevate the temperature to effect movement between states. This morphing bi-stable laminate can thereby morph from one stable state to the other stable state by the heating effect.

In another example, the actuator 40 may be an air source that is operable to apply a pressure to "snap" the lower surface 36 to the deployed shape 36B or a suction to "snap" the lower surface 36 to the stowed shape 36A. It should be appreciated that various other actuators will benefit herefrom.

The actuator 40 may be operated in response to a control subsystem 42 that generally includes a control module 44 with a processor 46, a memory 48, and an interface 50. The processor 46 may be any type of microprocessor having desired performance characteristics. The memory 48 may include any type of computer readable medium which stores the data and control algorithms described herein such as those that deploy and configure the wings 22 for the desired flight operations.

With reference to FIGS. 5 and 6, to facilitate maintaining the lower surface 36 in the deployed shape 36B, one or more articulable spars 60 extends between the lower surface 36 and the upper surface 34. The articulable spars 60 function as structural members within each wing 22 to react to the torsional, bending, shear, and other loads developed within the wing 22 during flight operations. As defined herein "articulable" includes but is not limited to folding, telescoping, bending, hinging, and other movement. In one disclosed non-limiting embodiment, bistable material may be utilized to facilitate movement and stable positions of the articulable spars 60 in both the stowed shape 36A and the deployed shape 36B.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An aerocar comprising:
   a body, the body having a width; and
   a multiple of wings, the multiple of wings being selectively extendable in a substantially vertical direction away from a top portion of the body for a flight mode and selectively retractable in a substantially vertical direction toward the top portion of the body for a roadable mode, each of the multiple of wings defining a span, the span being generally equivalent to the width of the body in both the flight mode and the roadable mode.

2. The aerocar as recited in claim 1, wherein the multiple of wings are stackable.

3. The aerocar as recited in claim 1, further including a multiple of wheels, wherein at least one of the multiple of wheels is a steerable wheel, and wherein at least one of the multiple of wheels is a drive wheel.

4. The aerocar as recited in claim 1, wherein each of the multiple of wings is individually selectively extendable in a substantially vertical direction away from the body for the flight mode.

5. The aerocar as recited in claim 1, wherein each of the multiple of wings is individually selectively retractable in a substantially vertical direction toward the body for the roadable mode.

6. The aerocar as recited in claim 1, wherein at least one of the multiple of wings is extended in a substantially vertical direction away from the body for the flight mode.

7. The aerocar as recited in claim 6, wherein the at least one of the multiple of wings is morphed from a stowed shape to a deployed shape for the flight mode.

8. The aerocar as recited in claim 1, wherein each of the multiple of wings includes an upper surface and a lower surface, wherein the upper surface forms a generally fixed shape, and wherein the lower surface is selectively morphable between a stowed shape and a deployed shape.

9. The aerocar as recited in claim 1, wherein all of the multiple of wings are extended away from the body for the flight mode.

10. The aerocar as recited in claim 1, wherein the multiple of wings are located atop the body.

11. The aerocar as recited in claim 1, wherein the multiple of wings are located at least partially within the body in the roadable mode.

12. An aerocar comprising:
    a body, the body having a width; and
    a multiple of stackable wings, the multiple of stackable wings being configured such that one or more of the stackable wings is selectively extended away from a top portion of the body for a flight mode and one or more of the stackable wings is selectively retracted toward the top portion of the body for a roadable mode, the wings being selectively morphable between a stowed shape for the roadable mode and a deployed shape for the flight mode, each of the multiple of wings defining a span, the span being generally equivalent to the width of the body in both the flight mode and the roadable mode.

13. The aerocar as recited in claim 12, further including:
    an actuator operatively connected to the multiple of stackable wings, the actuator being configured to:
    for the flight mode, morph the one or more of the stackable wings that are selectively extended away from the top portion of the body from the stowed shape to the deployed shape; and
    for the roadable mode, morph the one or more of the stackable wings that are selectively retracted toward the top portion of the body from the deployed shape to the stowed shape.

14. The aerocar as recited in claim 12, wherein the multiple of wings are individually selectively extendable away from the top portion of the body for the flight mode and individually selectively retractable toward the top portion of the body for the roadable mode.

15. The aerocar as recited in claim 12, wherein the wings include an upper surface and a lower surface, wherein the upper surface is a generally fixed shape, and wherein the lower surface is morphable between the stowed shape and the deployed shape.

16. A method of configuring an aerocar having a flight mode and a roadable mode, the aerocar including a body and a multiple of wings, each of the multiple of wings defining a span, the span being generally equivalent to the width of the body in both the flight mode and the roadable mode, the method comprising:
    selectively extending at least one of the multiple of wings in a substantially vertical direction away from a top portion of the body for the flight mode; and selectively retracting the at least one of the multiple of wings in a substantially vertical direction toward the top portion of the body for the roadable mode.

17. The method as recited in claim 16, further including:
selectively extending all of the multiple of wings in a substantially vertical direction away from the top portion of the body for the flight mode.

18. The method as recited in claim 16, further including:
morphing the selectively extended at least one of the multiple of wings from a stowed shape to a deployed shape in the flight mode; and
morphing the selectively retracted at least one of the multiple of wings from a deployed shape to a stowed shape in the roadable mode.

19. The method as recited in claim 18, wherein morphing the selectively extended at least one of the multiple of wings from the stowed shape to the deployed shape in the flight mode includes morphing a lower surface of the selectively extended at least one of the multiple of wings from the stowed shape to the deployed shape.

* * * * *